United States Patent
Yoshida et al.

(10) Patent No.: US 8,081,336 B2
(45) Date of Patent: *Dec. 20, 2011

(54) IMAGE FORMING APPARATUS, IMAGE PROCESSING METHOD, AND PROGRAM

(75) Inventors: Okihisa Yoshida, Amagasaki (JP); Yoichi Kawabuchi, Itami (JP); Daisuke Sakiyama, Kawanishi (JP); Tomonari Yoshimura, Kyoto (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,898

(22) Filed: Jan. 5, 2011

(65) Prior Publication Data

US 2011/0102843 A1  May 5, 2011

Related U.S. Application Data

(62) Division of application No. 11/366,600, filed on Mar. 3, 2006, now Pat. No. 7,889,369.

(30) Foreign Application Priority Data

Jul. 12, 2005  (JP) ................................ 2005-203387

(51) Int. Cl.
*G06F 3/12* (2006.01)
*G06K 15/00* (2006.01)

(52) U.S. Cl. .................... 358/1.15; 358/1.13; 358/1.14; 358/1.16; 358/1.17; 358/400; 358/401

(58) Field of Classification Search ........ 358/1.13–1.17, 358/400, 401

See application file for complete search history.

(56) References Cited

U.S. PATENT DOCUMENTS 7,023,573 B2   4/2006   Ohhashi et al.
7,224,491 B2   5/2007   Shinchi et al.
(Continued)

FOREIGN PATENT DOCUMENTS

JP   2001-352419   12/2001
(Continued)

OTHER PUBLICATIONS

Notification of Reasons for Refusal dated Dec. 4, 2007 issued in corresponding Japanese Application No. 2005-203387 with English Translation. Decision of Patent Grant dated Nov. 25, 2008 issued in corresponding Japanese Application No. 2005-203387 with English Translation.

*Primary Examiner* — James A Thompson
*Assistant Examiner* — Satwant Singh
(74) *Attorney, Agent, or Firm* — Buchanan Ingersoll & Rooney PC

(57) ABSTRACT

The above object is achieved by an image forming apparatus connected to a network and used for forming an image on a sheet, comprising: a 1st obtaining unit operable to obtain via the network, with respect to each of one or more image files related to an authenticated user, (i) a corresponding identification information piece and (ii) a corresponding storage-destination information piece indicating a storage destination; a display unit operable to display the obtained identification information pieces; a receiving unit operable to receive a specification of, among the displayed identification information pieces, an identification information piece for an image file that the authenticated user desires to obtain; and a 2nd obtaining unit operable to obtain, via the network, the desired image file corresponding to the specified identification information piece from a storage destination indicated by a storage-destination information piece of the desired image file.

20 Claims, 16 Drawing Sheets

U.S. PATENT DOCUMENTS

| | | | |
|---|---|---|---|
| 7,515,289 B2 * | 4/2009 | Ohtuka | 358/1.15 |
| 7,586,635 B2 | 9/2009 | Maeda et al. | |
| 2003/0107760 A1 * | 6/2003 | King et al. | 358/1.15 |
| 2004/0080771 A1 | 4/2004 | Mihira et al. | |
| 2005/0185214 A1 * | 8/2005 | Suwabe | 358/1.15 |
| 2006/0007500 A1 | 1/2006 | Abe et al. | |
| 2006/0098225 A1 * | 5/2006 | Machida | 358/1.15 |

FOREIGN PATENT DOCUMENTS

| | | |
|---|---|---|
| JP | 2002-041461 | 2/2002 |
| JP | 2002-132837 A | 5/2002 |
| JP | 2004-013183 | 1/2004 |
| JP | 2005-039411 | 2/2005 |
| JP | 2005-092505 | 4/2005 |

\* cited by examiner

| ID | NAME | PASSWORD | PRINTING | BOX USE | TRANSMISSION |
|----|------|----------|----------|---------|--------------|
| 1 | oobayashi | ***** | ○ | ○ | ○ |
| 2 | Z | ***** | ○ | ○ | ○ |
| 3 | matsushita | ***** | ○ | ○ | ○ |
| 4 | imaizumi | ***** | ○ | ○ | ○ |
| 5 | kawaguchi | ..... | ..... | ..... | ..... |

| ID | NAME | MEETING ||||
|----|------|---------|---|---|---|
|    |      | A-Meeting | B-Meeting | C-Meeting | D-Meeting |
| 1 | oobayashi | ○ | ○ | — | ○ |
| 2 | Z | — | ○ | — | ○ |
| 3 | matsushita | ○ | — | — | — |
| 4 | imaizumi | ○ | ○ | ○ | — |
| 5 | kawaguchi | ○ | — | — | ○ |
| ..... | ..... | ..... | ..... | ..... | ..... |

| MEETING NAME | DATE/TIME | SECURITY | STORAGE DESTINATION |
|--------------|-----------|----------|---------------------|
| A-Meeting | 05/4/8/10:00 | MEDIUM | /usr/public/resume/mtg-a/Info.ppt |
| B-Meeting | 05/4/15/13:00 | HIGH | /usr/public/resume/mtg-b/presentation.ppt |
| C-Meeting | 05/4/18/15:00 | MEDIUM | /usr/public/resume/mtg-c/materialC.ppt |
| D-Meeting | 05/4/19/11:00 | HIGH | /usr/public/resume/mtg-d/information.ppt |
| ..... | ..... | ..... | ..... |

| FILE INFORMATION REGISTRATION SCREEN | | |
|---|---|---|
| MEETING NAME | A-Meeting | 2031 |
| DATE/TIME | 05/4/8/10 : 00 | 2032 |
| SECURITY | MEDIUM | 2033 |
| STORAGE DESTINATION | /usr/public/resume/mtg-a/Info.ppt | 2034 |
| | CANCEL   NEXT | 2035 |

| PARTICIPANTS INFORMATION REGISTRATION SCREEN | | |
|---|---|---|
| USER ID | NAME | ATTENDANCE INFORMATION |
| 1 | oobayashi | ATTENDANCE |
| 2 | Z | ABSENCE |
| 3 | matsushita | ATTENDANCE |
| 4 | imaizumi | ATTENDANCE |
| 5 | kawaguchi | ATTENDANCE |
| ... | ... | ... |

2045
2046
2047
2048
2049

CANCEL    END 2041  2042  2043           2044

FIG. 8A

310
BOX ACCESS SCREEN

USER ID    0002    ← 311
PASSWORD   ****    ← 312

CANCEL   END    — 313

FIG. 8B

320
BOX INFORMATION | ID : 0002   Name : Z

IMAGE
IMAGE
B-Meeting        05/4/15/13 : 00
D-Meeting        05/4/19/11 : 00

FIG. 8C

330
BOX INFORMATION | ID : 0002   Name : Z

B-Meeting MEETING MATERIAL
STORAGE DESTINATION
/usr/public/resume/mtg-b/presentation.ppt    ← 333

PRINT   TRANSFER   CANCEL
 331      332

FIG. 8D

340
BOX INFORMATION | ID : 0002   Name : Z

B-Meeting MEETING MATERIAL

PRINT   TRANSFER   CANCEL
 341      342

| USER ID | No | ATTRIBUTE | DATE/TIME | SECURITY | STORAGE DESTINATION |
|---|---|---|---|---|---|
| 0002 | 0001 | IMAGE | ------ | --- | ------ |
| | 0002 | IMAGE | ------ | --- | ------ |
| | 0003 | B-Meeting | 05/4/15/13:00 | HIGH | /usr/public/resume/mtg-b/presentation.ppt |
| | 0004 | D-Meeting | 05/4/19/11:00 | HIGH | /usr/public/resume/mtg-d/information.ppt |

| MATERIAL REQUEST SCREEN | | |
|---|---|---|
| USER ID | 0002 | ← 421 |
| PASSWORD | * * * * | ← 422 |
| MEETING NAME | B-Meeting | ← 423 |
| ADDRESS | http://MFP ˙ ˙ ˙ BOX/ID2 | ← 424 |
| | CANCEL    END | |

425

IMAGE FORMING APPARATUS, IMAGE PROCESSING METHOD, AND PROGRAM

This application is a divisional of application Ser. No. 11/366,600, filed Mar. 3, 2006 which in turn claims priority to Japanese Application No. 2005-203387, filed Jul. 12, 2005, the contents of which are hereby incorporated by reference in their entirety.

BACKGROUND OF THE INVENTION

[1] Field of the Invention

The present invention is related to an image forming apparatus connected to a network, an image processing method and a program.

[2] Related Art

A meeting management system used, in a company or the like that holds meetings, for distributing meeting information from meeting organizers to individual participants before each meeting is disclosed in Japanese Laid-Open Patent Application Publication No. 2002-132837.

This meeting management system is configured by connecting a terminal of each meeting organizer, a terminal of each participant, and a server storing meeting materials therein by a network. The meeting management system allows a meeting organizer to transmit, via the network, meeting information to the terminal of each participant before the meeting. Here, a hyperlink to a storage location of a meeting material is inserted into the meeting information so that each participant is able to browse the meeting material on its own terminal.

However, the meeting management system above is designed so that the meeting organizer unilaterally transmits meeting information to the terminal of each participant. Therefore, for example, if a participant mistakenly deletes the meeting information on its terminal before seeing it, the meeting material cannot be printed out beforehand. In such a case, the participant may ask the meeting organizer to transmit the meeting information again if knowing who the meeting organizer is; however, this will be a redundant operation for the meeting organizer. Furthermore, if the participant does not know who the meeting organizer is, there is no way for the participant to obtain the meeting material. It may still be possible that the participant accesses the server and searches for the meeting material; however, the search operation will claim significant time and effort if vast amounts of files are saved on the server.

This kind of problem is not unique to meeting management systems, and could happen in a similar fashion to systems used for distributing related materials to a lot of participants—for example, distributing lecture notes and other materials to students at schools.

SUMMARY OF THE INVENTION

The present invention aims at providing an image forming apparatus, an image processing method, and a program by which a user is able to obtain a necessary material with simpler operation.

No 1 The above object is achieved by an image forming apparatus connected to a network and used for forming an image on a sheet, comprising: a 1st obtaining unit operable to obtain via the network, with respect to each of one or more image files related to an authenticated user, (i) a corresponding identification information piece and (ii) a corresponding storage-destination information piece indicating a storage destination; a display unit operable to display the obtained identification information pieces; a receiving unit operable to receive a specification of, among the displayed identification information pieces, an identification information piece for an image file that the authenticated user desires to obtain; and a 2nd obtaining unit operable to obtain, via the network, the desired image file corresponding to the specified identification information piece from a storage destination indicated by a storage-destination information piece of the desired image file.

The term "image files" here mean data files used to show images, and are therefore not limited to image data developed into bitmap format. A wide range of files—such as image data compressed or converted to a predefined format—is here included in the image files.

Here, when the 1st obtaining unit obtains the identification information piece and storage-destination information piece, these information pieces may be obtained all together. Or alternatively, the 1st obtaining unit may separately obtain these information pieces.

Additionally, the term "identification information piece" means information to identify a corresponding image file, and suffices if it serves as an identifier. File names and file formats, for example, can be used as the identification information.

Furthermore, the term "a specification of, . . . (omitted) . . . , an identification information piece for an image file" here implies, of course, a situation in which one or more identification information pieces are specified when multiple identification information pieces are displayed, but also implies the case of specifying, when only a single identification information piece is displayed, the identification information piece.

Assume that the image forming apparatus is applied to a system for distributing meeting materials as image files, for example. Here, meeting organizers register in advance identification information pieces and storage-destination information pieces of image files with an apparatus on the network so that users who will be attending meetings can obtain these information pieces from the apparatus. Herewith, individual users are able to obtain image files of desired meeting materials from the image forming apparatus at their own convenience. In addition, the present invention achieves to save conventional troubles of users due to loss of a meeting notice—such as having to request retransmission of a meeting notice from a meeting organizer and being not able to output a meeting material.

Additionally, since authenticated users are limited only to users expected to be participants, meeting materials are indiscriminately output from the image forming apparatus to nobody, and the security is thus ensured. Furthermore, meeting organizers save the trouble of transmitting meeting notices again upon request of participants, which provides convenience for both meeting organizers and participants.

In addition, the image forming apparatus above may further comprise: a storage unit having a box established as a storage area for the authenticated user; a 1st storing unit operable to store in the box, as a file information piece, each of the obtained identification information pieces and the corresponding one of the obtained storage-destination information pieces; and a 2nd storing unit operable to store, in the box, the obtained image file. Here, the display unit displays the file information pieces of the obtained image file currently stored in the box and the obtained identification information pieces currently stored in the box.

Herewith, each user is able to store, in its own box, various types of data that the user needs, such as file information pieces and image files. This facilitates data management.

The image forming apparatus above may further comprise: an image forming unit operable to form, on the sheet, the image based on the obtained image file.

Herewith, the user is able to obtain printouts of a desired image file only by carrying out a simple operation of specifying inputs.

The image forming apparatus above may further comprise: a transfer-destination specification unit operable to receive a specification of a transfer destination of the desired image file; and a transfer unit operable to execute a transfer of the obtained image file to the specified transfer destination.

Herewith, the user is able to transfer the obtained image file to an external apparatus, and to output the image file on the external apparatus, for example.

In addition, the transfer unit may receive, from the authenticated user, confirmation of whether the transfer is necessary, and execute the transfer when the transfer is confirmed as necessary.

Herewith, the user is able to select whether or not the transfer is necessary, and to perform the transfer of the image file according to need.

The image forming apparatus above may further comprise: a transfer-destination specification unit operable to receive a specification of a transfer destination of the storage-destination information piece of the desired image file; and a transfer unit operable to execute a transfer of the storage-destination information piece to the specified transfer destination.

Herewith, the user is able to transfer, to an external apparatus, a storage-destination information piece indicating a storage destination of the desired image file, and to check the storage destination on the external apparatus.

The image forming apparatus above may further comprise: a transfer-destination specification unit operable to receive a specification of a transfer destination of the storage-destination information piece of the desired image file; a generating unit operable to generate access information which allows, when an external apparatus requests to access the desired image file, the external apparatus to indirectly access the desired image file via the image forming apparatus itself; and a transfer unit operable to transfer the access information to the specified transfer destination.

Herewith, a user who uses an apparatus of the transfer destination cannot directly access the image file. This avoids revealing the storage destination to this user, and the security is thus ensured.

The image forming apparatus above may further comprise: a setting unit operable to set a security level. Here, the storage-destination information piece is information which allows, when the external apparatus requests to access the desired image file, the external apparatus to directly access the desired image file without involving the image forming apparatus. Additionally, the transfer unit transfers one of the generated access information and the storage-destination information piece to the specified transfer destination according to the set security level.

Herewith, setting a security level make it possible to select either the access information or the storage-destination information piece is transferred. This allows to make an adjustment between ensuring of security and convenience.

The image forming apparatus above may further comprise: an access-authorized-user judging unit operable to judge, when the external apparatus requests to access the desired image file based on the access information, whether a user of the external apparatus is authorized to access the indicated storage destination. Here, the 2nd obtaining unit obtains the desired image file from the indicated storage destination when the user is determined as authorized, and the transfer unit transfers the image file obtained by the 2nd obtaining unit to the external apparatus.

Herewith, image files are transferred only to access-authorized users, and it can be avoided that image files come to be in the possession of unauthorized users.

The transfer unit may receive confirmation of whether the transfer is necessary from the authenticated user before the 2nd obtaining unit obtains the desired image file, and prohibit the 2nd obtaining unit from obtaining the desired image file when the transfer is confirmed as necessary.

The user selecting that the transfer of the storage-destination information piece is necessary can be interpreted as that the user has an intention to obtain the image file from an external apparatus. In such a case, network traffic can be reduced by the image forming apparatus having a structure that prohibits the acquisition of the image file.

The image forming apparatus above may further comprise: an image forming unit operable to form the image on the sheet based on an image file; a transfer-destination specification unit operable to receive a specification of a transfer destination of the desired image file; a transfer unit operable to transfer an image file to the specified transfer destination; and an output selecting unit operable to select whether to cause the image forming unit to form the image based on the obtained image file or to cause the transfer unit to transfer the obtained image file to the specified transfer destination.

Herewith, the user is able to select an output method for the image file according to need, which thus provides convenience to the user.

The display unit may include a display judging unit operable to judge, according to a set security level, whether a display of the indicated storage destination is permitted. Here, the display unit displays the indicated storage destination when the display judging unit determines that the display is permitted, while not displaying the indicated storage destination when the display judging unit determines that the display is not permitted.

Herewith, it is possible not to display the storage destination, when the security level is set to "high", for example. This further enhances the security.

The identification information piece and the storage-destination information piece for the each of one or more image files may be stored in an external apparatus on the network. Here, the 1st obtaining unit obtains the identification information pieces and the storage-destination information pieces from the external apparatus via the network.

Herewith, when the image forming apparatus has a structure in which an administrator or the like registers identification information pieces and storage-destination information pieces in advance, the administrator can perform the registration on the external apparatus even when being at a remote location from the image forming apparatus. This provides convenience to the administrator.

The each of one or more image files may be stored in a server on the network. Here, the storage destination is a storage location of the each of one or more image files in the server.

Herewith, all image files are collectively stored in the server, which facilitates management of the image files.

The above object is achieved by an image processing method for an image forming apparatus connected to a network and used for forming an image on a sheet, comprising the steps of: (a) obtaining via the network, with respect to each of one or more image files related to an authenticated user, (i) a corresponding identification information piece and (ii) a corresponding storage-destination information piece indicating a storage destination; (b) displaying the obtained identification information pieces; (c) receiving a specification of, among the displayed identification information pieces, an identification information piece for an image file that the user desires to obtain; and (d) obtaining, via the network, the desired image file corresponding to the specified identification information piece from a storage destination indicated by a storage-destination information piece of the desired image file.

The above object is achieved by a program causing a computer to execute processes in an image forming apparatus connected to a network and used for forming an image on a sheet, comprising the processes of: (a) obtaining via the network, with respect to each of one or more image files related to an authenticated user, (i) a corresponding identification information piece and (ii) a corresponding storage-destination information piece indicating a storage destination; (b) displaying the obtained identification information pieces; (c) receiving a specification of, among the displayed identification information pieces, an identification information piece for an image file that the user desires to obtain; and (d) obtaining, via the network, the desired image file corresponding to the specified identification information piece from a storage destination indicated by a storage-destination information piece of the desired image file.

BRIEF DESCRIPTION OF THE DRAWINGS

These and other objects, advantageous effects and features of the invention will become apparent from the following description thereof taken in conjunction with the accompanying drawings which illustrate specific embodiments of the invention. In the drawings:

FIGS. 2a-2c show, in table format, contents of information stored in a storage unit of the authentication server;

FIG. 4 shows a file information registration screen displayed on an operation panel of the authentication server;

FIG. 5 shows a participants information registration screen displayed on the operation panel;

FIGS. 8a-8d show examples of screen displays presented on an operation panel of the MFP;

FIG. 9 is an example illustrating, in table format, management information of all files currently stored in a BOX provided in the MFP;

FIG. 15 is an example of a material request screen presented on the display of the PC.

DESCRIPTION OF PREFERRED EMBODIMENTS

The following describes an embodiment of an image forming apparatus of the present invention in reference to drawings.

Figure 1:
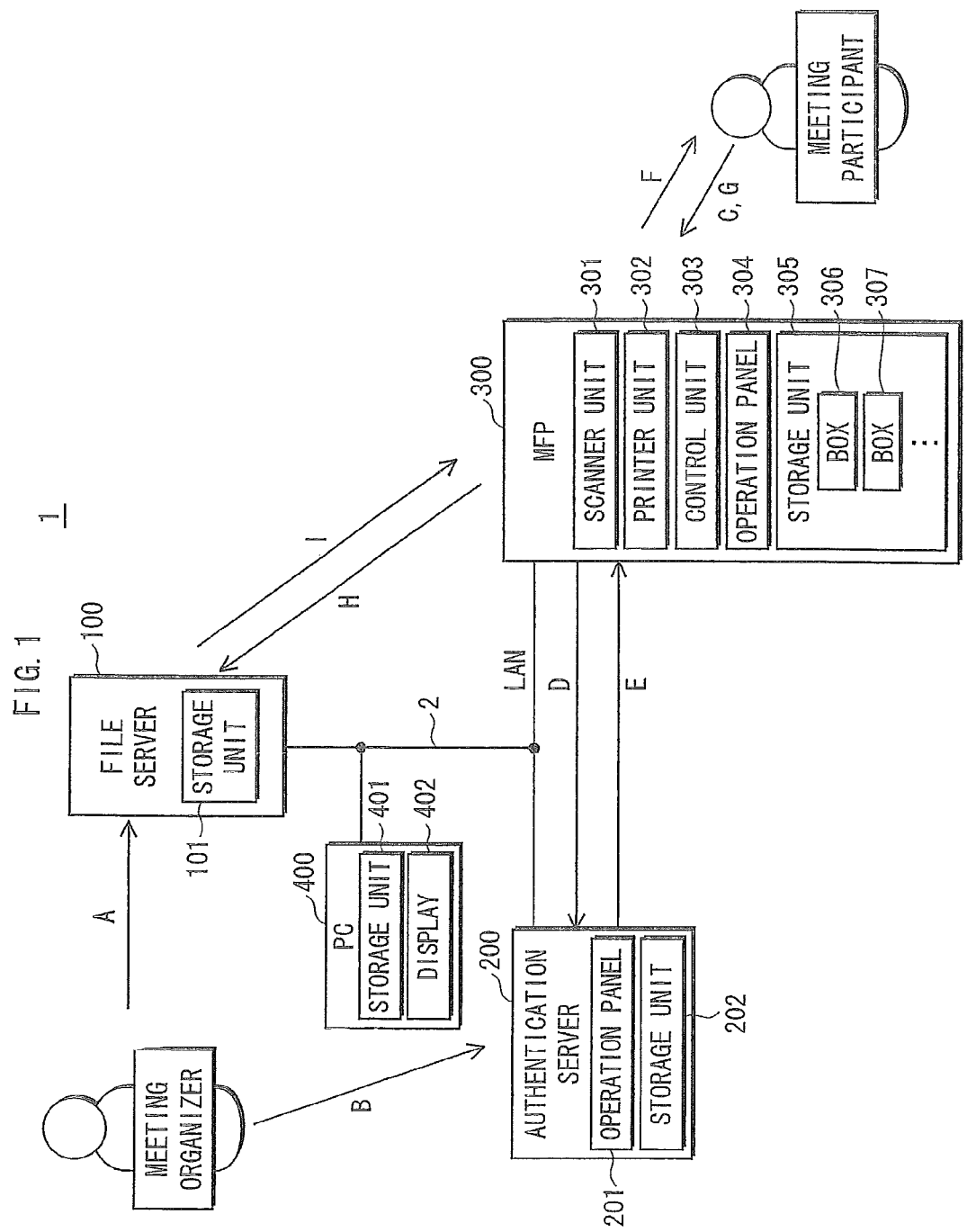
FIG. 1 shows a structure of an image processing system comprising a file server, an authentication server, a PC, and a MFP functioning as an image forming apparatus.

FIG. 1 shows a structure of an image processing system 1 including the image forming apparatus.

The image processing system 1, as shown in the figure, has a structure in which a file server 100, an authentication server 200, a MFP (Multiple Function Peripheral) 300, a terminal 400 that is a PC (personal computer) and the like are connected via a network—here, a LAN (Local Area Network) 2, and are able to exchange various types of data with each other. The image processing system 1 is used as a meeting management system.

The file server 100 has a storage unit 101 in which image files such as meeting materials are stored, and has functions to read and transmit a requested image file in response to receipt of a transmission request from outside.

The image files here mean data files used to show images, and are therefore not limited to image data developed into bitmap format. Such image files also include data files used to ultimately show images on a sheet or a display—such as data created on a PC by application software for processing documents and the like, and data generated by converting the data created by application software into a PDL (Page Description Language). Such an image file is hereinafter referred to simply as a "file".

The MFP 300 is a multifunctional digital composite apparatus comprising, as main components: a scanner unit 301; a printer unit 302; a control unit 303; an operation panel 304; and a storage unit 305.

The scanner unit 301 reads an image of an original set therein. The printer unit 302 performs an image forming operation (i.e., printing) according to publicly-known electrophotographic technology. Controlling the overall operations of the scanner unit 301 and the printer unit 302, the control unit 303 performs a various range of jobs such as: a scan job of reading an image of an original source; a copy job of printing the read and obtained image on a sheet; a print job of conducting print operation in response to a printing direction from an external terminal; and a file obtaining job of obtaining a file from the file server 100.

The operation panel 304 includes, besides a copy start button and a numeric keypad for setting the number of copy sets, a liquid crystal display unit on the surface of which a touch panel is provided. In response to a direction of the control unit 303, the operation panel 304 displays a necessary screen while receiving an input through the numeric keypad, a touch input or the like from the user, and transmitting the received input information to the control unit 303.

The storage unit 305 is provided with boxes of user-specific storage areas (hereinafter, referred to as "BOXes") 306, 307 . . . , and each BOX here is designed to allow login only after user's identification number (a user ID) and password are entered from the operation panel 304. After a BOX is logged in, on the operational panel 304, file names of individual files stored in the BOX are displayed in a list as identification information.

After selecting any one of the file names displayed in the list, the user can print out an image of the selected file, or attach the selected file to an e-mail or the like and transfer this to other apparatuses on the LAN 2. The user can also store, in its own BOX, various files such as images obtained by scan jobs and meeting materials.

The authentication server 200 comprises an operation panel 201 and a storage unit 202, and performs, for example, authentication of a user of the MFP 300.

The operation panel 201 includes a liquid crystal display unit having a touch panel, and receives a touch input or the like from the user.

Stored in the storage unit 202 are: user information including user passwords for authentication; participants information showing participants of scheduled meetings; and file information showing meeting names and storage destinations for files of meeting materials.

FIGS. 2A-2C show contents of the information stored in the storage unit 202 in table format, and are specific examples of user information 211, participants information 212, and file information 213, respectively.

The user information 211 comprises information of individual columns from "ID" to "TRANSMISSION". User IDs are written in the ID column; user names, in the NAME column; passwords corresponding to the user IDs, in the PASSWORD column; information of whether individual users are permitted to perform print operation on the MFP 300 (here, an open circle denotes "permitted", and the same is applied to the following), in the PRINTING column; information of whether individual users are permitted to use a BOX, in the BOX USE column; and information of whether individual users are permitted to transmit images, in the TRANSMISSION column. Since including passwords, the user information 211 is registered in advance by an administrator who manages the system. Here, the system is configured so that the administrator is able to register necessary information from a special registration screen (not shown) displayed on the operation panel 201.

The participants information 212 comprises information of individual columns from "ID" to "MEETING". The ID and NAME columns are the same as those in the user information 211.

Written in the MEETING column are meeting names (such as A-Meeting) and information showing which users are scheduled to take part in (i.e. attend) each meeting. Here, users with open circles are prospective participants of each meeting.

The file information 213 comprises information of individual columns from "MEETING NAME" to "STORAGE DESTINATION".

In the MEETING NAME column, the same meeting names as those of the participants information 212 are written. In the DATE/TIME column, information showing a date and a time for each meeting is written.

Written in the STORAGE DESTINATION column are storage destinations of materials used for respective meetings (meeting materials). Here, the storage destinations are storage locations within the storage unit 101 of the file server 100.

In the SECURITY column, information showing a security level—either "MEDIUM" or "HIGH"—is written. "MEDIUM" denotes that a corresponding meeting material can be disclosed to users other than the participants of the meeting, while "HIGH" denotes that a corresponding material can be disclosed only to the participants of the meeting. The participants information 212 and file information 213 are registered, in advance before the holdings of meetings, by each meeting organizer from a registration screen 203 (FIG. 4) dedicated to the organizer. Note that those passwords are confidential, and users other than the administrator cannot therefore browse them.

The outline of process operation performed in the image processing system 1 having such a structure is described next with the aid of FIG. 1.

[1] A meeting organizer causes the file server 100 to store therein data of a meeting material to be distributed to the participants as an image file (Process A). In addition, the participants information 212 and file information 213 are registered with the authentication server 200 (Process B). Assume here that the user information 211 has already been registered with the authentication server 200.

[2] A participant—for example, User—a enters the user ID and password to log in to its own BOX in the MFP 300 (Process C).

[3] The MFP 300 transmits the entered user ID and password to the authentication server 200, and requests authentication of User a (Process D).

[4] The authentication server 200 performs authentication using the received user ID and password, and informs the MFP 300 of the result. If the authentication of User a is verified, file information of meetings that User a is scheduled to attend is transmitted to the MFP 300 (Process E).

[5] When the authentication of User a is verified, the MFP 300 gives each piece of the file information (corresponding to a meeting that User a is scheduled to attend) from the authentication server 200 a file name, using the name of the meeting for the file name, and stores the pieces of file information in the BOX, while displaying a list of names of files that are currently stored therein (Process F).

[6] User a can select, from the file names displayed on the list, a file with a name of a meeting of which material the user desires to obtain (Process G).

[7] The MFP 300 requests a storage destination of the meeting material of the selected meeting name—here, the file server 100—to transmit the meeting material (Process H), receives the meeting material transmitted from the file server 100 (Process I), and then prints out the meeting material, for instance.

Herewith, participants have freedom to check, at any given time, names of meetings that they are scheduled to attend only by being authenticated by the MFP 300, and are also able to obtain printouts of desired meeting materials by selecting any of the meeting names.

On the other hand, if having once stored meeting material in the file server 100 and registered the participants information 212 and file information 213 with the authentication server 200, meeting organizers then become entirely free from work such as material distribution even if there are a lot of participants. Thus, this leads to saving the meeting organizers time and effort.

The following specifically describes process operations of the authentication server 200, file server 100, and MFP 300.

Figure 3:
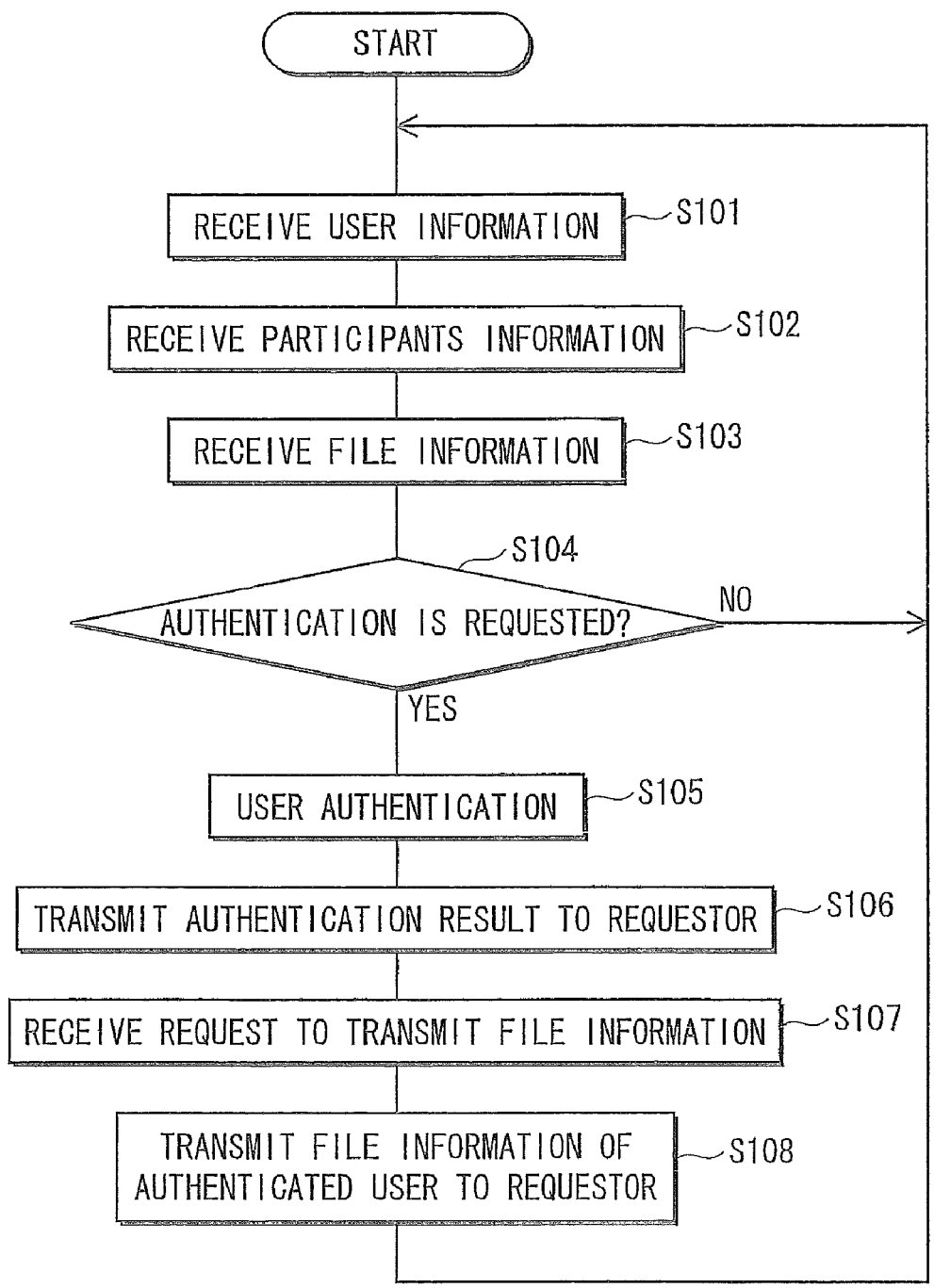
FIG. 3 is a flowchart showing process operation performed by the authentication server.

FIG. 3 is a flowchart showing process operation performed by the authentication server 200. As shown in the figure, the authentication server 200 receives an input of the user information 211, and stores the received information in the storage unit 202 (Step S101).

Then, the authentication server 200 receives inputs of the participants information 212 and file information 213 (Steps S102 and S103).

FIGS. 4 and 5 illustrate examples of screens displayed on the operation panel 201 for receiving the inputs.

FIG. 4 shows a registration screen 203 for the file information 213.

On the registration screen 203, a MEETING NAME input field 2031, a DATE/TIME input field 2032, a SECURITY input field 2033, and a STORAGE DESTINATION input field 2034 are provided as shown in the figure. With respect to each input field, when its display section is touched, a different screen for character and symbol input—specifically speaking, a screen with a keypad whose keys are arranged in the same fashion as those on a keyboard—is displayed.

The meeting organizers can input, specify, and correct necessary information—for example, a meeting name for the MEETING NAME input field 2031, and a storage destination (e.g. address) of the meeting material for the STORAGE DESTINATION input field 2034—from the keypad screen. The input information is displayed in corresponding input fields.

FIG. 5 shows a registration screen 204 of the participants information 212.

It is designed to switch to the registration screen 204 from the registration screen 203 when a button 2035 at the bottom of the registration screen 203 in FIG. 4 is touched.

On the registration screen 204, a USER ID column 2041, a NAME column 2042, and an ATTENDANCE INFORMATION column 2043 are provided. In the USER ID column 2041 and NAME column 2042, user IDs and names which are the same as those registered in advance as the user information 211 are displayed.

Information regarding attendance/absence of the meeting is displayed in the ATTENDANCE INFORMATION column 2043. In the ATTENDANCE INFORMATION column 2043, input boxes 2045 to 2048, and 2049 . . . corresponding to individual users are provided, and when a display section of each input box is touched, a selection screen for selecting attendance/absence is displayed for the meeting of the MEETING NAME input field 2031. The meeting organizer can selectively input attendance/absence for each user from the selection screen.

When an end button 2044 at the bottom of the registration screen 204 is touched, the input process is considered to be finished, and all information input on the registration screens 203 and 204 is stored in a predetermined storage area of the storage unit 202 as the file information 213 and participants information 212 (registration of each type of information: corresponding to Process B in FIG. 1).

Referring now back to FIG. 3, when receiving a request for user authentication from the MFP 300 ("YES" in Step S104) (corresponding to Process D in FIG. 1), the authentication server 200 performs user authentication by referring to the user information 211 in the storage unit 202 (Step S105), and transmits the result to the MFP 300 having requested the authentication (Step S106).

Subsequently, receiving a request to transmit file information of the user from the MFP 300 (Step S107), the authentication server 200 reads the requested file information from the file information 213 in the storage unit 202 and transmits the read file information to the MFP 300 (Step S108) before returning to Step S101 (corresponding to Process E in FIG. 1).

In the case where an authentication-target user is "User Z", for example, it can be seen from the participants information 212 in FIG. 2 that User Z is scheduled to attend "B-Meeting" and "D-Meeting". The authentication server 200 reads, for each of "B-Meeting" and "D-Meeting", information in the MEETING NAME, DATE/TIME, SECURITY, and STORAGE DESTINATION columns from the file information 213, and transmits the read information to the MFP 300 as the file information of User Z. Note that, when there is no authentication request ("NO" in Step S104), the authentication server 200 returns to Step S101.

Figure 6:
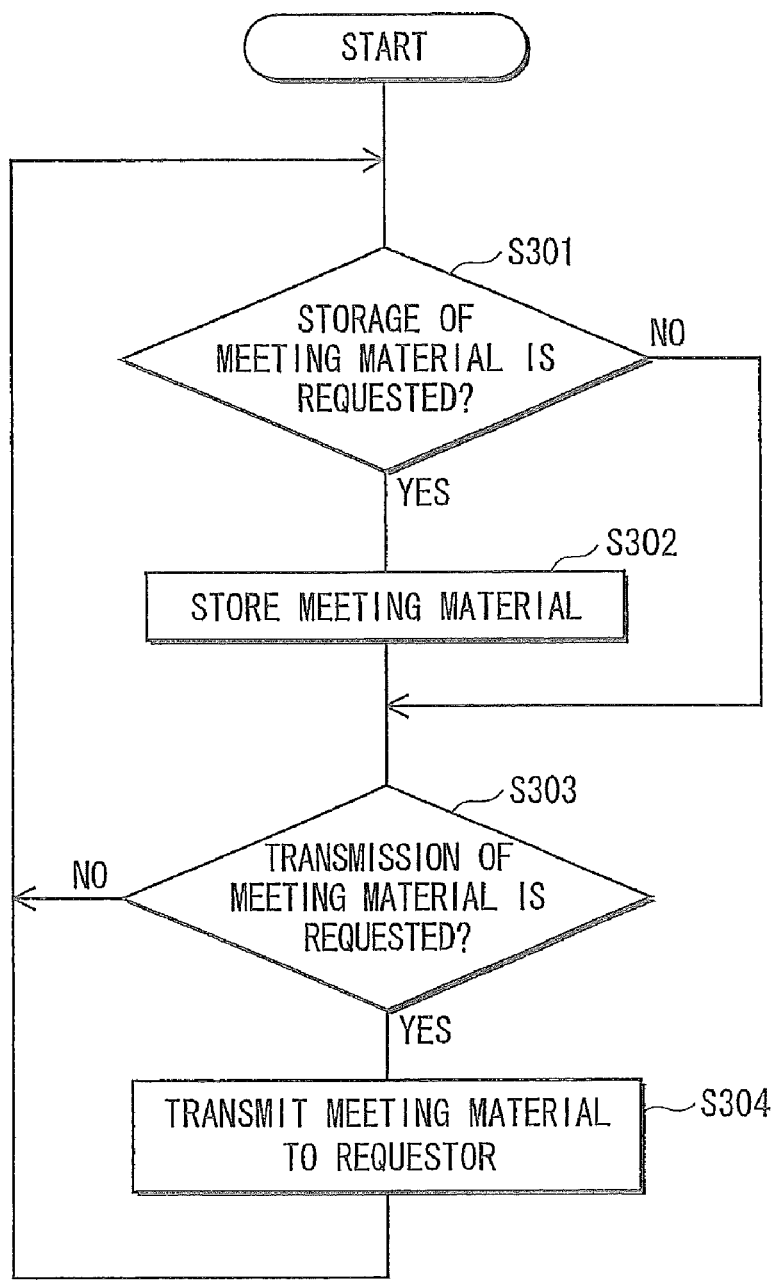
FIG. 6 is a flowchart showing process operation performed by the file server.

FIG. 6 is a flowchart showing process operation performed by the file server 100.

As shown in the figure, when receiving a request to store a meeting material from a meeting organizer ("YES" in Step S301), the file server 100 performs a process of storing the requested meeting material in file format in the storage unit 101 (Step S302) (corresponding to Process A in FIG. 1).

Examples of such a process to be performed are: receiving data, such as a document of meeting material, via the LAN 2; and reading data from a compact disc or another recording medium and storing the read data as a file.

When requested from the MFP 300 to transmit a meeting material ("YES" in Step S303), the file server 100 reads the requested meeting material from the storage destination in the storage unit 101 and transmits the read meeting material to the requestor—here the MFP 300—(Step S304) before returning to Step S301. Note that, when there is no request ("NO" in Step S301), the file server 100 moves to Step S303.

Figure 7:
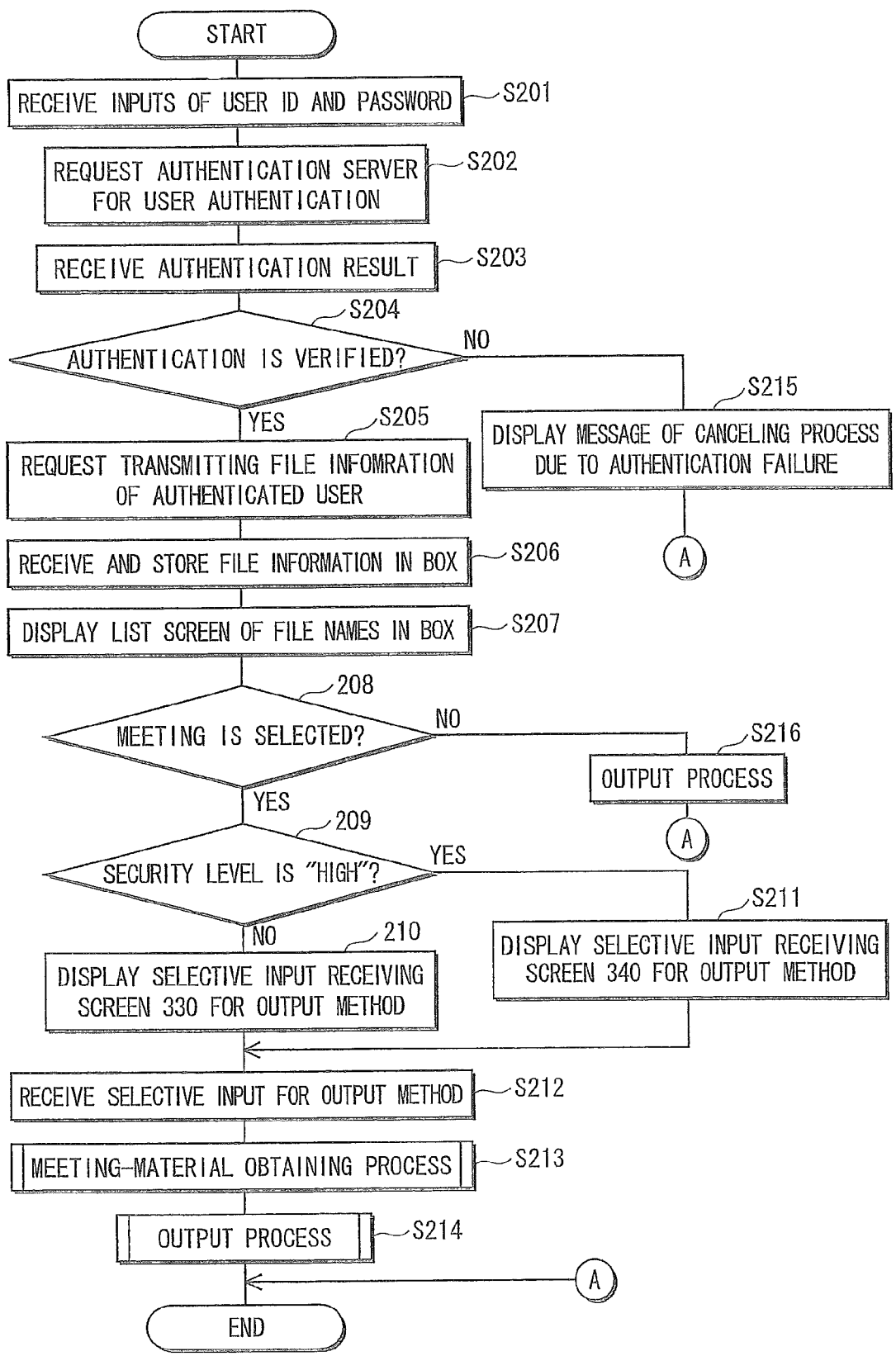
FIG. 7 is a flowchart showing a main routine of process operation performed by the MFP.

FIG. 7 is a flowchart showing the main routine of process operation performed by the MFP 300. The process operation is implemented when a BOX function is selected by a user on a menu screen (not shown) of the operation panel 304. In addition, FIGS. 8A to 8D illustrate examples of screens displayed on the operation panel 304 during the execution of the process operation.

As shown in FIG. 7, the MFP 300 displays, on the operation panel 304, an access screen for accessing a BOX, and receives inputs of a user ID and a password (Step S201) (corresponding to Process C in FIG. 1).

FIG. 8(A) shows a display example of an access screen 310.

As shown in the figure, a USER ID input field 311 and a PASSWORD input field 312 are provided on the access screen 310. It is designed to display, for each input field, a different screen for inputting a numerical value or the like when the display section is touched. The user can, for example, input and correct the user ID and the like from the different screen for each input field.

When an end button 313 of the access screen 310 is touched, the input process is considered to be finished. Then, the MFP 300 transmits information showing the input user ID and password to the authentication server 200, and requests authentication of the user (Step S202) (corresponding to Process D in FIG. 1).

When receiving the authentication result from the authentication server 200 (Step S203) and determining that the authentication has been failed ("NO" in Step S204), the MFP 300 displays a message indicating that the process is cancelled due to the authentication failure on the operation panel 304 (Step S215) before terminating the process.

On the other hand, when determining that the authentication has been verified ("YES" in Step S204), the MFP 300 requests the authentication server 200 to transmit file information related to the user—specifically speaking, pieces of file information, each of which corresponds to meetings that the user is scheduled to attend (Step S205) (corresponding to Process D in FIG. 1).

Receiving the file information from the authentication server 200, the MFP 300 stores, in the BOX specific to the user, the received file information in file format, assigning a file name to each piece of the file information with the use of a corresponding meeting name included therein (Step S206). The following describes an example in which a name of the user is "Z" and a BOX specific to User Z is "BOX 306".

FIG. 9 is an example illustrating, in table format, management information of all files currently stored in the BOX 306.

As shown in the figure, a USER ID column, a number (No) column, an ATTRIBUTE column, a DATE/TIME column, a SECURITY column, and a STORAGE DESTINATION column are provided in a table 3061. Information for each column is written by the control unit 303.

In the USER ID column, the ID of User Z—here, "2"—is written. In the number column, numbers in the order of file storage are assigned.

In the ATTRIBUTE column, attributes of stored files are written. Specifically speaking, in the case when a stored file is an image obtained by scanning or sent from another apparatus, a denotation "IMAGE" is written in the column.

In the case when a stored file is file information, its meeting name is used as a denotation and provided in the column. As described above, the file information only includes information such as a meeting name and a storage destination and does not include image data, and the file information pieces and images are therefore distinguished by information (i.e. denotations) in the ATTRIBUTE column.

In the DATE/TIME column, dates and times of meetings included in file information pieces are written, while information on security levels and storage destinations is written in the corresponding columns. With the example of User Z, the received file information includes two meeting names "B-Meeting" and "D-Meeting". Therefore, as shown in FIG. 9, the file information is separated into a file No. 3 for "B-Meeting" and a file No. 4 for "D-Meeting" (i.e. pieces of the file information).

Referring now back to FIG. 7, in Step S207, the MFP 300 displays, on the operation panel 304, a list screen showing a list of file names of all files stored in the BOX 306.

FIG. 8B is an example of a list screen 320.

As shown in the figure, the list screen 320 displays information showing an attribute stored in the ATTRIBUTE column of the table 3061 above for each file. As to the file information, meeting's date and time stored in the DATE/TIME column are also displayed.

By referring to the list screen 320, User Z is able to check what files are stored in its own BOX 306. With regard to meetings, User Z can also check which meetings the user is scheduled to attend.

With respect to each file, when the display section is touched (i.e., a file is specified), a different screen is displayed in which User Z can make a selective input for what process is performed on the file, and then the process selected by the user in the different screen is performed.

Specifically speaking, when the display section of "IMAGE" is touched, the MFP 300 determines that an image has been selected ("NO" in Step S208), and displays a selection screen for printing, transferring or the like (not shown). Subsequently, when printing is selected by User Z, for example, data of the selected image file is read from the storage area, and a printing process is performed based on the read data (Step S216).

On the other hand, when the display section of "meeting name" is touched, the MFP 300 determines that a meeting has been selected ("YES" in Step S208), and further judges either "high" or "medium" the security level for the selected meeting name is set to (Step S209). The judgment is determined by referring to information written in an area, within the SECURITY column of the table 306, corresponding to the meeting name.

Determining that the security level is not "high"—namely "medium" ("NO" in Step S209), the MFP 300 displays, on the operation panel 304, a selection screen for receiving a selective input from User Z in terms of an output method (printing or transferring) of the meeting material (Step S210).

FIG. 8C is a display example of a selection screen 330.

As shown in the figure, information on a storage destination of the meeting material is displayed in a mid-section 333 of the selection screen 330. The display of the storage destination is achieved by reading information written in an area, within the storage-destination column of the table 3061, corresponding to the meeting name.

In addition, in the lower section of the selection screen 330, a print button 331 and a transfer button 332 are provided. The print button 331 will be selected by the user to print out the meeting material. On the other hand, the transfer button 332 will be selected to transfer the meeting material to an external terminal without printing it out on the MFP 300, or to transfer only file information to an external terminal.

On the other hand, determining that the security level is "high" ("YES" in Step S209), the MFP 300 displays, on the operation panel 304, a selection screen 340 different from the above selection screen 330 to receive a selective input from User Z (Step S211).

FIG. 8D is a display example of the selection screen 340.

As shown in the figure, information on a storage destination of the meeting material is not displayed in the selection screen 340. The reason that the display of a storage destination is changed according to the security level will be described hereinafter.

User Z is able to select an output method by touching a button for specifying the output method—here, the print button 331 (341) or the transfer button 332 (342)—in the selection screen 330 (340).

Receiving a selective input for the output method from User Z (Step S212), the MFP 300 performs a meeting material obtaining process and an output process (Steps S213 and S214).

Figure 10:
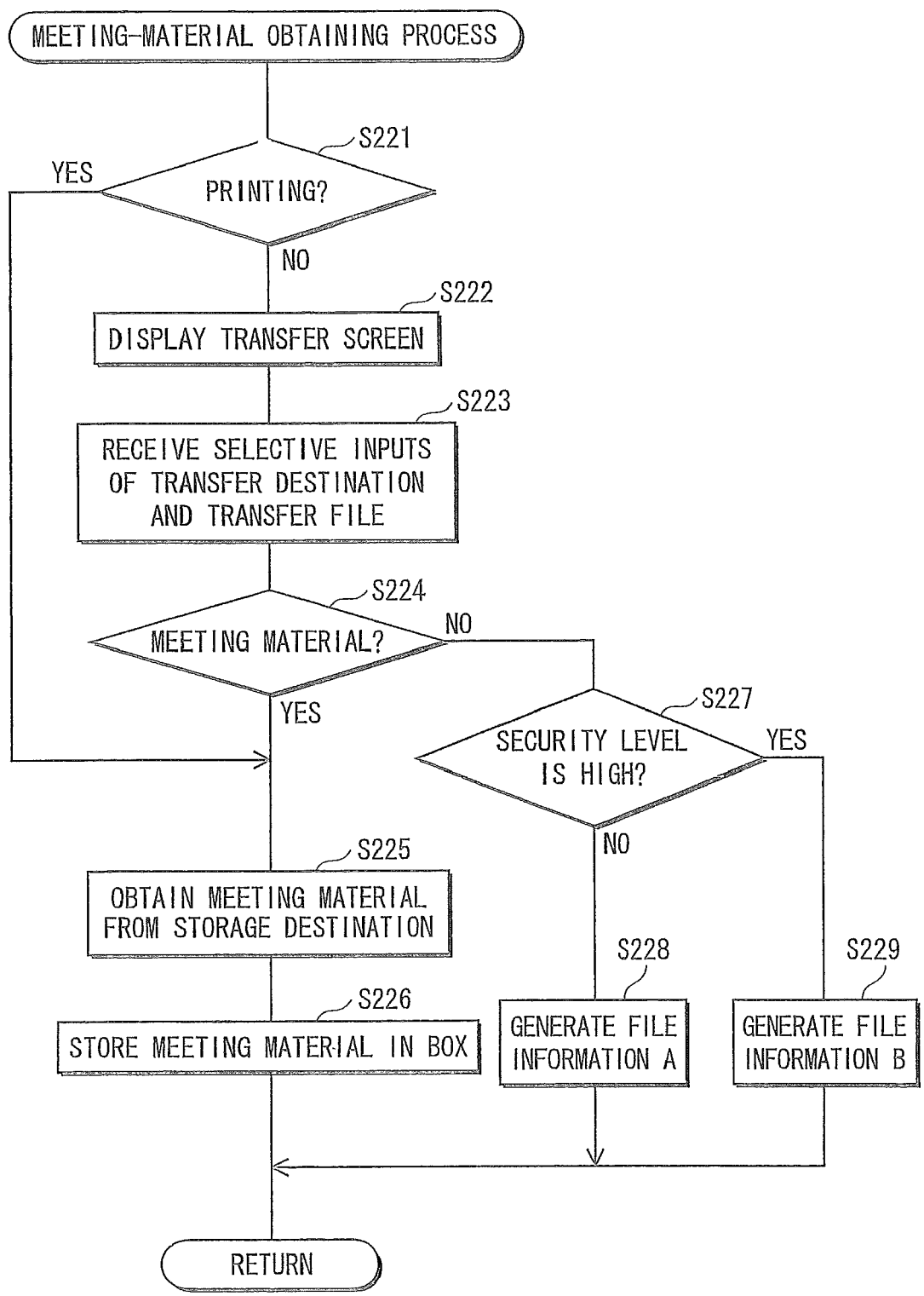
FIG. 10 is a flowchart showing a subroutine operation of a meeting-material obtaining process performed by the MFP.

FIG. 10 is a flowchart showing a subroutine operation of the meeting-material obtaining process.

As shown in the figure, the MFP 300 judges that either printing or transfer has been selected as the output method (Step S221). This is achieved by determining that either printing or transfer was selected in Step S212 above.

Determining that printing has been selected ("YES" in Step S221), the MFP 300 reads information written in an area, within the STORAGE DESTINATION column of the table 3061, corresponding to the meeting name, attempts access to the read storage destination (corresponding to Process H in FIG. 1), and obtains a file of the meeting material from the storage destination (Step S225) (corresponding to Process I in FIG. 1).

For example, when the meeting name "B-Meeting" is selected, an address "/user/purlic/resume/mtg-b/presentation.ppt" of the storage destination corresponding to "B-Meeting" in the table 3061 is accessed. In this regard, it can be said that the "meeting name" corresponds to identification information for identifying a file of the meeting material, while "storage destination" corresponding to storage destination information indicating a storage destination of the file. The control unit 303, operation panel 304 and the like function as a display unit for displaying identification information when processes of Step S207 and the like are carried out, while functioning as a receiving unit for receiving a specification of, from among at least one piece of identification information, identification information of a file that the user desires to obtain when processes of Step S208 and the like are carried out.

Then, the MFP 300 stores the obtained meeting material file in the BOX 306 (Step S226), and returns to the main routine.

For example, when the meeting material is for "B-Meeting", the meeting material is registered in the table 3061 as a new file with (i) the attribute denoted as, for example, "material B-Meeting", which includes a description of "material"

and the meeting name in order to distinguish itself from scanned images and other images, and (ii) a file number, e.g. 0005, added thereto.

On the other hand, when determining that not printing but transfer has been selected ("NO" in Step S221), the MFP 300 displays, on the operation panel 304, a transfer screen for transfer (Step S222), and receives selective inputs for a transfer destination and a transfer file (Step S223).

Figure 11:
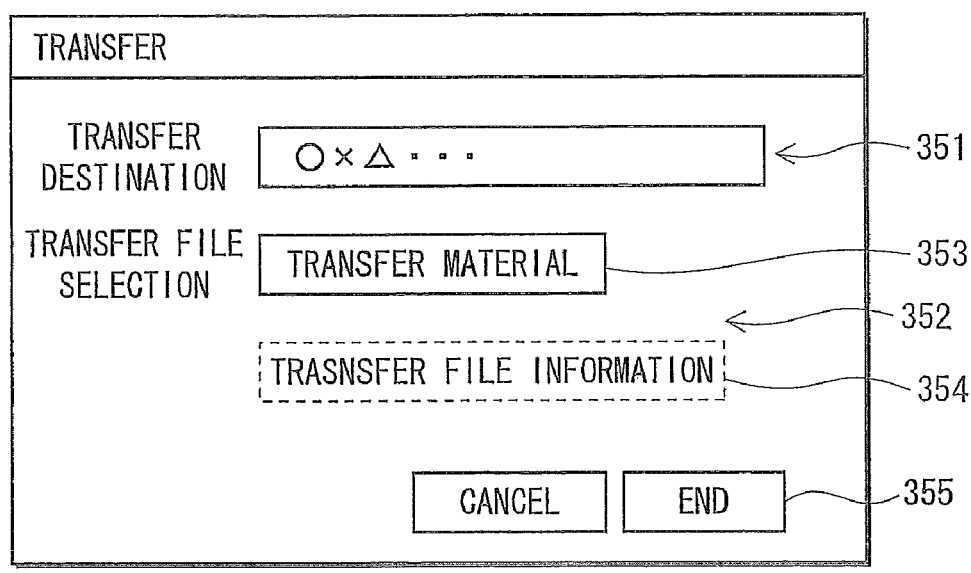
FIG. 11 shows an example of a transfer screen displayed on the operation panel of the MFP.

FIG. 11 is a display example of a transfer screen 350.

As shown in the figure, a TRANSFER DESTINATION field 351 and a TRANSFER FILE SELECTION field 352 are provided on the transfer screen 350.

It is designed to display, when the display section of the TRANSFER DESTINATION field 351 is touched, a different screen for selecting a transfer method (e-mail, HTTP, or Hypertext Transfer Protocol, FTP, or File Transfer Protocol, etc.) and inputting an address of the transfer destination's apparatus. Thus, User Z can select, input, and/or correct the transfer method and destination from the different screen.

The TRANSFER FILE SELECTION field 352 is a field for receiving, from the user, a selective input for transferring either meeting material or file information. User Z can select either one of them by touching the buttons 353 or 354. The example shown in the figure depicts a case in which the meeting material has been selected (the solid line).

When an end button 355 is touched by User Z, the receiving process of the selective input is considered to be finished, and the MFP 300 then moves to Step S224. In this regard, it can be said that, in the case when processes of Steps S222, S223 and the like are carried out, the control unit 303, operation panel 304 and the like function as a transfer-destination specifying unit for receiving a specification of a transfer destination.

In Step S224, the MFP 300 judges whether the meeting material is selected as a file to be transferred.

Here, determining that the meeting material has been selected ("YES" in Step S224), the MFP 300 moves to Step S225. In this case, a corresponding file of the meeting material is obtained from the file server 100.

On the other hand, determining that the meeting material has not been selected—i.e., determining that the file information has been selected ("NO" in Step S224), the MFP 300 judges the security level set for the selected meeting name (Step S227). Determining that the security level is "medium" ("NO" in Step S227) by referring to the table 3061, the MFP 300 generates File Information A as file information to be transferred (Step S228) before returning to the main routine. Here, File Information A is information including a meeting name, a date and a time, and a storage destination of the meeting material, and is generated by reading information corresponding to the selected meeting name from the table 3061.

When the security level is determined "high" ("YES" in Step S227), the MFP 300 generates File Information B (Step S229) before returning to the main routine.

Here, File Information B is information indicating a meeting name, such as "B-Meeting", and a storage location of the BOX 306 in the storage unit 305—for example, "http:// MFP . . . /BOX/ID2".

Note that, in the case where a file to be transferred is file information ("NO" in Step S224), the process of Step S225 is not carried out, and meeting material is accordingly not obtained; however, a structure may also be adopted that obtains and stores meeting material in a BOX even when file information is transferred.

Figure 12:
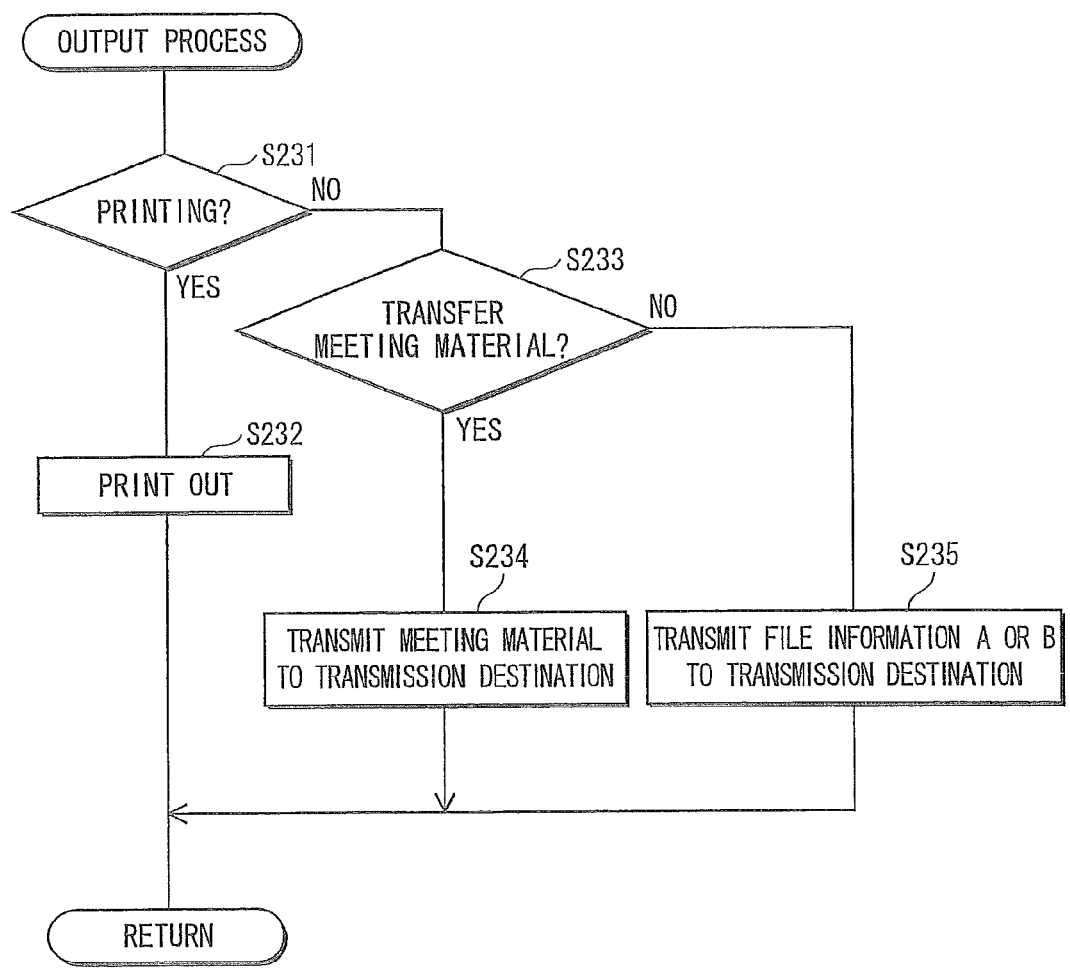
FIG. 12 is a flowchart showing a subroutine operation of an output process performed by the MFP.

FIG. 12 is a flowchart showing a subroutine operation of the output process.

As shown in the figure, the MFP 300 judges that either printing or transfer was selected as the output method in Step S212 above (Step S231).

Determining that printing has been selected ("YES" in Step S231), the MFP 300 reads a file of the meeting material already obtained from the file server 100 and stored in the BOX 306, and prints out the read file (Step S232).

For example, in the case of a meeting having a meeting name of "B-Meeting", a file of which attribute in the ATTRIBUTE column of the table 3061 is "material B-Meeting" is read. Herewith, User Z is able to obtain, from the MFP 300, printouts of the meeting material for "B-Meeting" that the user wants.

When determining that not printing but transfer has been selected ("NO" in Step S231), the MFP 300 judges that either meeting material or file information has been selected as the transfer file in Step S224 above (Step S233).

When determining that meeting material has been selected ("YES" in Step S233), the MFP 300 transfers a file of the meeting material to a specified transfer destination (Step S234). The following describes an example of when the transfer destination is the PC 400.

On the other hand, determining that file information has been selected ("NO" in Step S233), the MFP 300 transmits, to the PC 400, a file of either File Information A generated in Step S228 above or File Information B generated in Step S229 (Step S235) before finishing the process.

Figure 13:
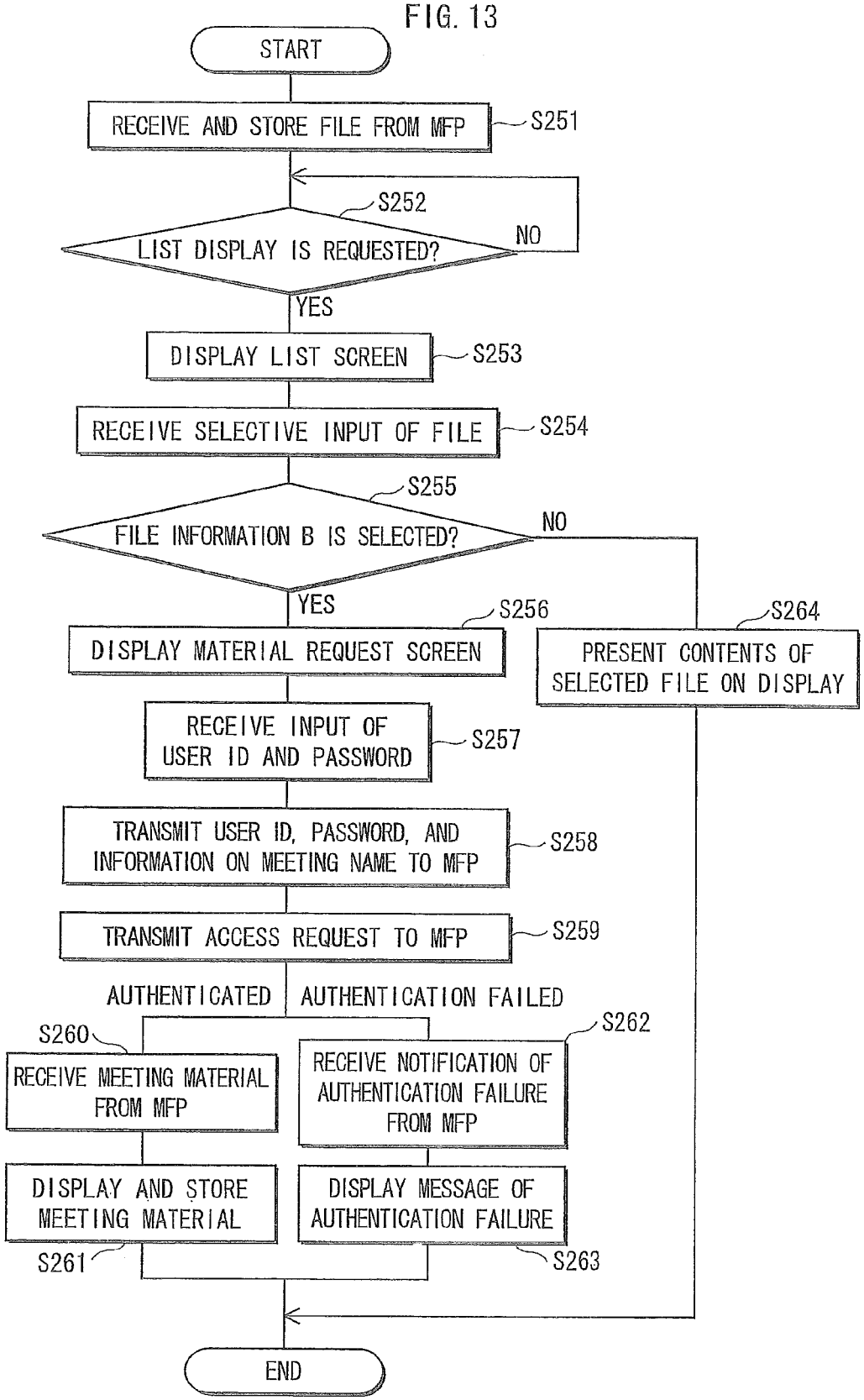
FIG. 13 is a flowchart showing process operation performed by the PC when receiving a file from the MFP.

FIG. 13 is a flowchart showing process operation performed by the PC 400 when receiving a file from the MFP 300.

As shown in the figure, the PC 400 stores a file from the MFP 300 in a special depository (hereinafter, referred to as a "meeting folder") provided in a storage unit 401 (Step S251). The PC 400 has the storage unit 401 comprising a hard disc drive or the like, and a display 402. When an icon of the meeting folder presented on the display 402 is clicked with a mouse or the like, the PC 400 determines to be requested to display a screen showing a list of files in the meeting folder ("YES" in Step S252), and displays a list screen (Step S253).

Figure 14:
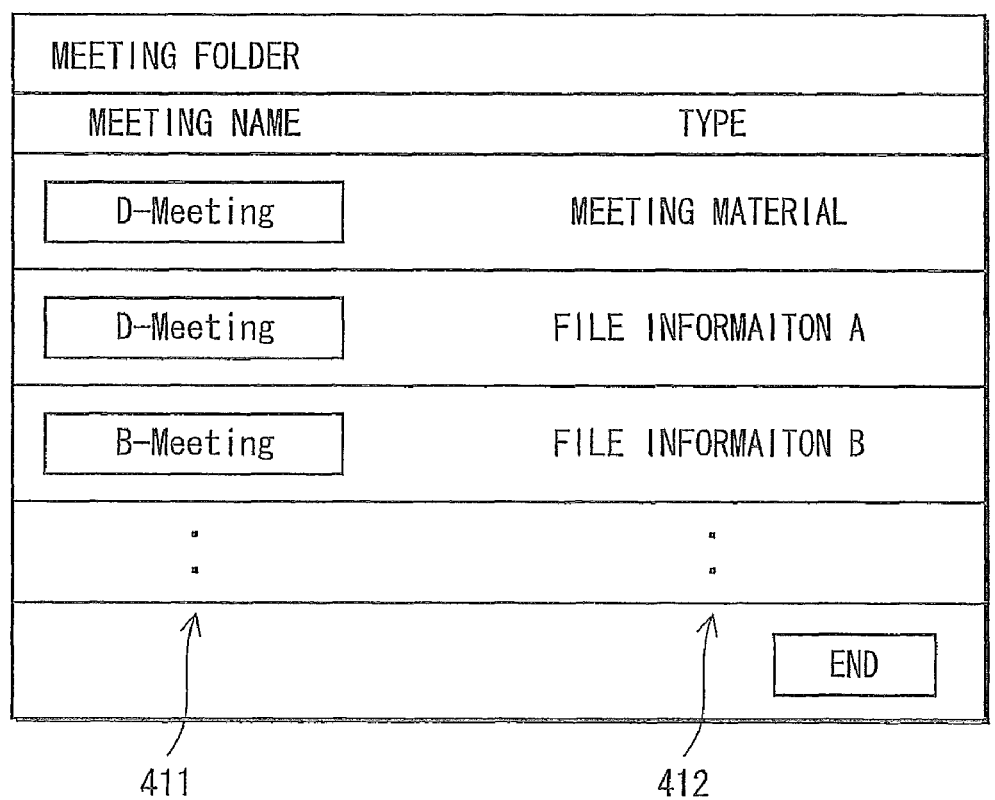
FIG. 14 is an example of a list screen presented on a display of the PC.

FIG. 14 shows an example of a list screen 410.

As shown in the figure, a MEETING NAME column 411 and a TYPE column 412 are provided in the list screen 410. With respect to each file, a meeting name and a type of the file are displayed in the MEETING NAME column 411 and the TYPE column 412, respectively. A file transmitted from the MFP 300 is any one of meeting material, File Information A, and File Information B. The transmitted file includes information indicating a type and a meeting name, and this information is read out.

User Z can select a file that the user wants to process by clicking on the display section of a meeting name in the MEETING NAME column 411.

Referring now back to FIG. 13, the MFP 300 judges which file was selected on the list screen 410 in Step S255.

Here, determining that File Information B was selected as the type ("YES" in Step S255), the PC 400 causes the display 402 to present a material request screen for requesting the MFP 300 to transmit meeting material (Step S256).

FIG. 15 shows a display example of a material request screen 420.

As shown in the figure, a USER ID input field 421, a PASSWORD input field 422, a MEETING NAME display field 423 and an ADDRESS field 424 are provided in the material request screen 420.

User Z is able to input, via a numeric keypad, its own user ID and password in the USER ID input field 421 and the PASSWORD input field 422, respectively. Note that an exact storage location of a BOX in the storage unit 305 of the MFP 300, included in File Information B, is displayed in the ADDRESS field 424. The figure shows an example in which a storage location of the BOX 306, http://MFP . . . /BOX/ID2, is displayed.

In a display section 425 of the ADDRESS field 424, a link for access to the BOX 306 is provided. An access attempt is launched when the display section 425 is clicked with a mouse.

Referring now back to FIG. 13, the PC 400 receives inputs of a user ID and a password from the material request screen 420 in Step S257. Subsequently, when the display section 425 of the ADDRESS field 424 is clicked, the PC 400 transmits the input user ID and password together with information indicating a meeting name to the MFP 300, and attempts to access the BOX (Steps S258 and S259).

Receiving the user ID and password from the PC 400, the MFP 300 transmits these to the authentication server 200, and requests the authentication server 200 to examine whether the requestor is User Z itself who is allowed to access the BOX 306, as described hereinafter. When the requestor is authenticated as User Z itself, the MFP 300 reads, from file information stored in the BOX for which an access request has been made, a storage destination of a meeting material corresponding to the meeting name received from the PC 400. Then, the MFP obtains a file of the meeting material from the read storage destination, and subsequently transmits, to the PC 400, the obtained file together with a notification that the requestor has been authenticated as User Z. In the case when the requestor is not authenticated, the MFP 300 only informs the PC 400 accordingly.

Receiving the notification that the user has been authenticated as well as the file of the meeting material from the MFP 300 (Step S260), the PC 400 (i) stores the received file in the meeting folder of the storage unit 401, (ii) launches application software corresponding to the file format, and (iii) presents contents of the meeting material on the display 402, using the application software (Step S261) before finishing the process. File Information B is access information which allows, when PC 400 attempts to access the file, the PC 400 to indirectly access the file via the MFP 300.

On the other hand, receiving a notification that the requestor has not been authenticated as User Z from the MFP 300 (Step S262), the PC 400 causes the display 402 to present a message to this effect (Step S263) before finishing the process.

When determining that not File Information B but a meeting material or File Information A was selected in Step S255, the PC 400 (i) moves to Step S264, (ii) launches, from among installed application software, one corresponding to the selected file format, and (iii) causes the display 402 to present contents of the meeting material or File Information A (Step S264) before finishing the process.

Figure 16:
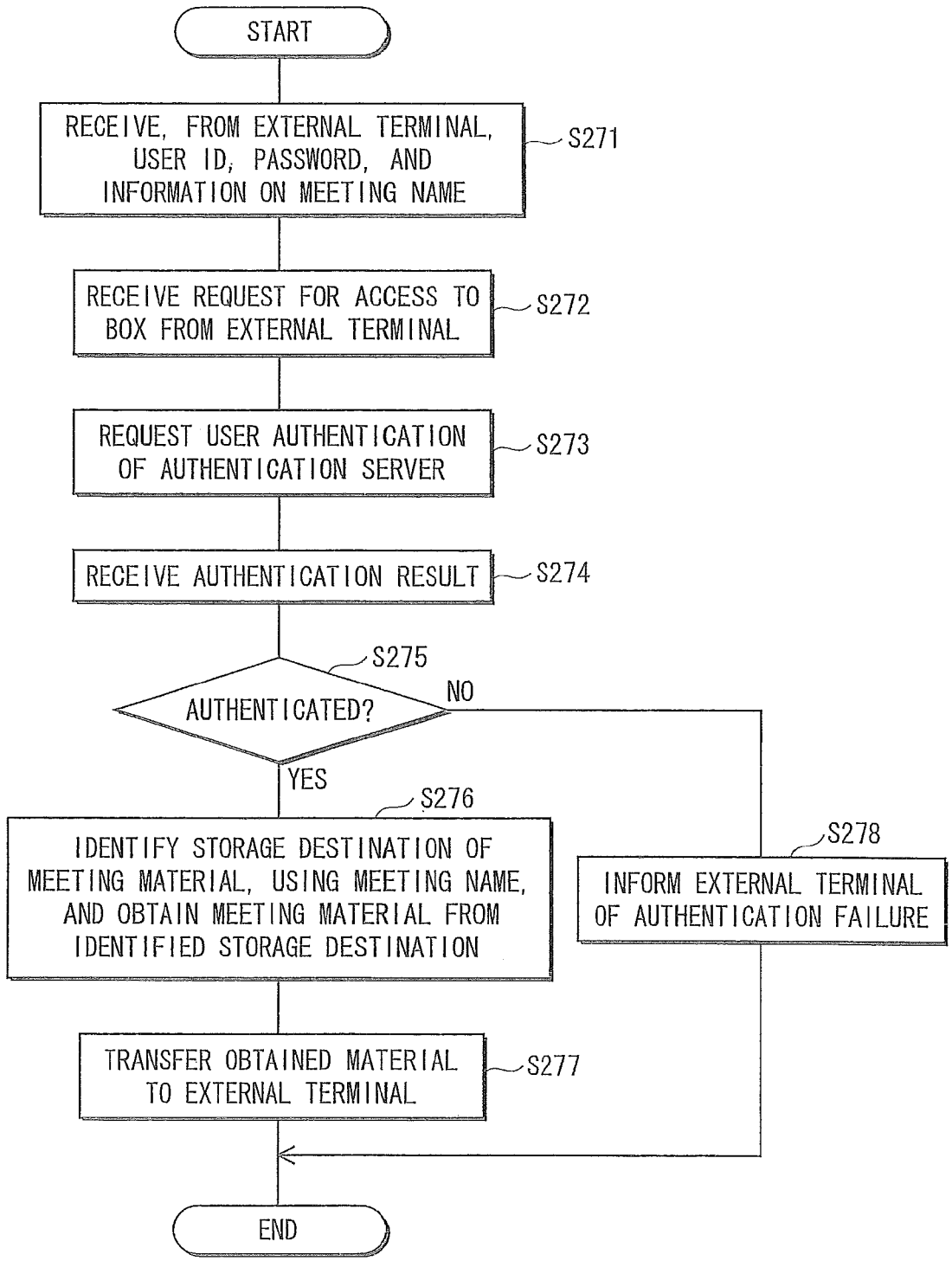
FIG. 16 is a flowchart showing process operation performed by the MFP when having received, from an external terminal, a request to transmit a meeting material.

FIG. 16 is a flowchart showing process operation performed by the MFP 300 when having received a request to transmit meeting material from an external terminal.

As shown in the figure, the MFP 300 receives, from an external terminal—here, the PC 400, a request for access to a BOX together with information indicating a user ID, a password, and a meeting name, as a transmission request of meeting material (Steps S271 and S272).

The MFP 300 transmits the received user ID and password to the authentication server 200, and requests authentication (Step S273). This process is the same as Step S202 above.

After receiving the authentication result from the authentication server 200 (Step S274) and determining that the user has been authenticated ("YES" in Step S275), the MFP 300 searches, from file information stored in the BOX for which the access request has been made, a storage destination of a meeting material corresponding to the meeting name received from the PC 400, and then reads the storage destination. For example, assume that a meeting name is "B-Meeting" and a BOX for which the access request has been made is the BOX 306. Here, by referring to the table 3061, "/usr . . . presentation.ppt" is read as a storage destination of the meeting material corresponding to the meeting name "B-Meeting".

The MFP 300 obtains a file of the meeting material by accessing the read storage destination (Step S276). Then, the MFP 300 transfers the obtained file to the external terminal, i.e. the PC 400 (Step S277). Here, it is configured that, when requested to transmit the meeting material from an external terminal, the MFP 300 identifies the storage destination by reading, from the STORAGE DESTINATION column of the meeting material stored in the table 3061, one corresponding to the meeting name; however, the present invention is not limited to the above method, and any method is applicable if the MFP 300 is able to obtain, from another apparatus, a meeting material for which an external terminal has made a transmission request.

The following is an example of feasible methods. With respect to each meeting name, a link is provided to a storage destination of a meeting material. Then, when receiving an access request, the MFP 300 jumps to a corresponding link to read and obtain a file of a meeting material. In this case, FTP, for example, can be used for file transfer.

On the other hand, determining in Step S275 that the authentication failed, the MFP 300 informs the PC 400 accordingly (Step S278), and ends the process.

As has been described, according to the present embodiment, individual participants can, at their own convenience, print out a meeting material on their own and transfer it to an external terminal, using the MFP 300. Therefore, it saves conventional troubles of users due to loss of a meeting notice—such as having to request retransmission of a meeting notice from a meeting organizer and being not able to output a meeting material, for example. In addition, since authenticated users are limited only to users expected to be participants, meeting materials are indiscriminately output from the MFP 300 to nobody, and the security is thus ensured.

In addition, if users on the part of the meeting organizers once carry out a registration process of the file information 213 and the like, they can save time and effort of transmitting meeting notices again upon request of the participants, which provides convenience for both meeting organizers and participants.

In addition, users on the part of the participants are able to select to transmit (transfer) file information to the external PC 400. When selecting File Information A on the list display screen 410 of the PC 400, the users are able to learn a storage destination of the meeting material on the display 402 of the PC 400. Accordingly, if a link is provided so as to connect the display section of the storage destination and the address of the meeting material, for example, a corresponding file can be obtained by directly accessing the file server 100 from the PC 400.

Since a storage destination of a meeting material is not included in File Information B, and is therefore not displayed, the users are not able to know the storage destination when File Information B is selected. In this case, it is possible to only indirectly obtain a corresponding file via the MFP 300.

Assume that, although a user is supposed to transmit file information from the MFP 300 to its own terminal—here, the PC 400, the user transmits it not to the PC 400, but mistakenly to someone else's terminal, for example. In such a case, the storage destination of the meeting material cannot be determined on the other person's terminal. Even if attempting to access the MFP 300, the other person will not be authenticated unless knowing a password of the user, and therefore, the meeting material will not be transferred to the other person's terminal from the MFP 300. Thus, the present embodiment has a significant advantage in security. This is also the case when file information has mistakenly been copied or moved to other person's BOX 307 or the like.

In addition, in the case when the security level of a meeting material is set to "high", like in the selection screen 340, it is designed that a storage destination of the meeting material is also not displayed on the operation panel 304 of the MFP 300. Accordingly, if users on the part of the meeting organizers have set the security level of the meeting material to "high" when registering the file information 213 with the authentication server 200, it can be avoided not only to reveal the storage destination of the meeting material to all users including the participants but also to let users other than the participants obtain the meeting material.

The present invention is not confined to the image forming apparatus, and may be an image processing method of obtaining image files for meeting materials and the like. The present invention may also be a program that achieves the method by a computer. In addition, the program of the present invention can be stored in various computer-readable recording medium, such as magnetic discs (e.g. magnetic tapes and flexible discs), optical and flash-memory recording media (e.g. DVD-ROM, DVD-RAM, CD-ROM, CD-R, MO, and PD). The present invention may be produced and transferred in the form of such recording media, or may be transmitted and supplied in the form of a program via networks, as represented by various wire/wireless communications including the Internet, broadcasting, telecommunication lines, and/or satellite communications.

The program of the present invention does not have to include all modules to cause a computer to execute the processes described above. By using various general-purpose programs—for example, communication programs and programs included in the operating system (OS)—that can be installed on another information processing apparatus, each process of the present invention may be carried out by the computer. Accordingly, all the modules above need not always be stored in the above-mentioned recording media of the present invention. Also, it is not necessary to transmit all the modules. Furthermore, predefined processes may be performed using special hardware.

[Modifications]

The present invention has been described based on the embodiment; however, it is a matter of course that the present invention is not confined to the above embodiment, and the following modifications are also within the scope of the present invention.

[1] Although, in the above embodiment, the user authentication is performed by the authentication server 200, it is designed that the authentication may be performed by the MFP 300, for example. This can be achieved by having a structure in which registration of the user information 211 is made in the MFP 300 and the authentication is carried out using an input password and the like together with the user information 211. In addition, if the MFP 300 has a structure to conduct the same processes performed by the authentication server 200, for example, registration of the participants information 212 and file information 213 can also be performed in the MFP 300. This results in eliminating the necessity of exchanges—such as authentication requests and result notifications—between the MFP 300 and the authentication server 200, which in turn leads to a reduction in network traffic.

[2] In the above embodiment, a "high" or "medium" security level is set to each meeting material itself, and whether or not a storage destination of the meeting material is displayed on the MFP 300 and the external PC 400 is changed according to the setting; however, the way to change the display/undisplay is not limited to this.

For example, instead of the security level, information of a department name (e.g. Group A) on the part of the meeting organizer is registered as the file information 213. Then, the MFP 300 receives, in Step S201 of FIG. 7, an input of a department name from the user in addition to the user ID and the like, and judges in Step S209 whether the department names match each other. Here, the MFP 300 displays the selection screen 330 if they match each other ("NO" in Step S209), while displaying the selection screen 340 when they do not match each other ("YES" in Step S209).

Herewith, if a participant is a user belonging to the same department (Group A), the meeting organizer can promote business by actively disclosing a storage destination of the meeting material and making available of the meeting material, while ensuring the security since the storage destination is not revealed to people belonging to another department (e.g. Group B).

In addition, in the case when the security level for communication with an external terminal is set with respect to each MFP, or when the level is set according to a security policy, display/undisplay of a storage destination of a meeting material may be changed according to such a level. In brief, display/undisplay of a storage destination of meeting material can be changed according to a security level set for any of the following: meetings, meeting materials, and MFPs.

Note that, when a structure that does not set security levels is employed, either File Information A or File Information B is generated in Step S228 or S229 above, for example, and the generated information may be transmitted to another apparatus.

[3] In the above embodiment, the user authentication is performed using a user ID and a password; however, the present invention is not limited to this, and can utilize any method that allows identification of users. For example, a method based on private-key encryption where random numbers and encryption are combined may be used.

In addition, the present invention is not confined to a method in which the user manually inputs its own ID and the like from the operation panel 304. Instead, the present invention may employ a method that a card, into which a RF-ID (Radio Frequency Identification) chip with ID or the like is written thereto is loaded, is brought closer to a reading unit provided in the MFP 300, and thereby the ID or the like is read from the RF-ID chip to perform the user authentication.

[4] In the above embodiment, meeting names (file names) are used as identification information for files of meeting materials; however, the present invention is not limited to these, and any identification information (identifiers) for identifying each of the files can be used.

For example, information such as a file format, a created date and time for each file, or a size may be used as the identification information, and such information may be managed, in the table 3061, in association with a storage destination of each file. In this case, a file format or the like is displayed on the list screen 320 as the identification information for each file so as to receive a selective input from the user.

[5] The above embodiment has a structure in which the user can make a selection between "printing" and "transferring" a meeting material or file information to another apparatus; however, a structure may be adopted that receives confirmation of the necessity of only "printing", or only "transferring" from the user. For example, when "transferring" is confirmed as necessary, the meeting material or file information will be printed. In this case, a screen for receiving a user input in terms of whether or not the transfer is necessary may be displayed, and the necessity of the transfer can be determined from this screen.

[6] In the above embodiment, the MFP 300 obtains, with respect to all meeting materials related to an authenticated user, meeting names (identification information) for these individual meeting materials and storage destination information of the storage destinations. However, the present invention is not limited to the case handling "all" meeting materials, and may obtain, with respect to one or more (i.e. at least one) meeting materials from among the "all", identification information and storage destination information of the meeting materials, for example.

Specifically speaking, a closing date for acquisition is assigned to each meeting material, for example, and the MFP 300 may obtain only meeting materials whose closing dates have not yet passed, or the MFP 300 may only obtain meeting materials of meetings which are held within a week from the present time (i.e. does not obtain those of meetings held more than a week later from now), for instance. A participant may forget about a meeting if the time until the meeting is held is too long. This can be avoided by setting in advance an acquisition condition as above.

In addition, the above explains the case where one of (one or more) meeting names is specified by the user on the list screen 320. However, for example, when multiple meeting names are displayed, the user may be allowed to specify multiple (i.e., all or at least two) meeting names out of them. In this case, processes—such as acquisition of an image file of each specified meeting name—are sequentially performed.

[7] The above embodiment explains an example where the present invention is applied to a system for distributing meeting materials; however, the present invention is not confined to "meetings". The present invention is broadly applicable to lectures at schools and other situations in which files of relevant materials need to be distributed to a lot of participants.

[8] The image forming apparatus is not limited to a MFP, and may be applied to a copier, a printer, a fax or the like. In addition, the present invention includes a structure in which two or more of the above embodiment and modifications are combined.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An image forming apparatus connected to at least a file server via a network and used for forming an image on a sheet, comprising:
    a 1st obtaining unit operable to obtain via the network, with respect to each of one or more image files related to an authenticated user, (i) a corresponding identification information piece and (ii) a corresponding storage-destination information piece indicating a storage destination;
    a display unit operable to display the obtained identification information pieces;
    a receiving unit operable to receive a specification of, among the displayed identification information pieces, an identification information piece for an image file that the authenticated user desires to obtain;
    a requesting unit operable to request to the file server to transmit the image file that the authenticated user desires to obtain; and
    a 2nd obtaining unit operable to receive from the file server, via the network, the desired image file corresponding to the specified identification information piece from a storage destination indicated by a storage-destination information piece of the desired image file.

2. The image forming apparatus of claim 1, further comprising:
    a storage unit having a box established as a storage area for the authenticated user;
    a 1st storing unit operable to store in the box, as a file information piece, each of the obtained identification information pieces and the corresponding one of the obtained storage-destination information pieces; and
    a 2nd storing unit operable to store, in the box, the obtained image file, wherein
    the display unit displays the file information pieces of the obtained image file currently stored in the box and the obtained identification information pieces currently stored in the box.

3. The image forming apparatus of claim 1, further comprising:
    an image forming unit operable to form, on the sheet, the image based on the obtained image file.

4. The image forming apparatus of claim 1, further comprising:
    a transfer-destination specification unit operable to receive a specification of a transfer destination of the desired image file; and
    a transfer unit operable to execute a transfer of the obtained image file to the specified transfer destination.

5. The image forming apparatus of claim 4, wherein
    the transfer unit receives, from the authenticated user, confirmation of whether the transfer is necessary, and executes the transfer when the transfer is confirmed as necessary.

6. The image forming apparatus of claim 1, further comprising:
    a transfer-destination specification unit operable to receive a specification of a transfer destination of the storage-destination information piece of the desired image file; and
    a transfer unit operable to execute a transfer of the storage-destination information piece to the specified transfer destination.

7. The image forming apparatus of claim 1, further comprising:
    a transfer-destination specification unit operable to receive a specification of a transfer destination of the storage-destination information piece of the desired image file;
    a generating unit operable to generate access information which allows, when an external apparatus requests to access the desired image file, the external apparatus to indirectly access the desired image file via the image forming apparatus itself; and
    a transfer unit operable to transfer the access information to the specified transfer destination.

8. The image forming apparatus of claim 7, further comprising:
a setting unit operable to set a security level, wherein
the storage-destination information piece is information which allows, when the external apparatus requests to access the desired image file, the external apparatus to directly access the desired image file without involving the image forming apparatus, and
the transfer unit transfers one of the generated access information and the storage-destination information piece to the specified transfer destination according to the set security level.

9. The image forming apparatus of claim 7, further comprising:
an access-authorized-user judging unit operable to judge, when the external apparatus requests to access the desired image file based on the access information, whether a user of the external apparatus is authorized to access the indicated storage destination, wherein
the 2nd obtaining unit obtains the desired image file from the indicated storage destination when the user is determined as authorized, and
the transfer unit transfers the image file obtained by the 2nd obtaining unit to the external apparatus.

10. The image forming apparatus of claim 6, wherein
the transfer unit receives confirmation of whether the transfer is necessary from the authenticated user before the 2nd obtaining unit obtains the desired image file, and prohibits the 2nd obtaining unit from obtaining the desired image file when the transfer is confirmed as necessary.

11. The image forming apparatus of claim 1, further comprising:
an image forming unit operable to form the image on the sheet based on an image file;
a transfer-destination specification unit operable to receive a specification of a transfer destination of the desired image file;
a transfer unit operable to transfer an image file to the specified transfer destination; and
an output selecting unit operable to select whether to cause the image forming unit to form the image based on the obtained image file or to cause the transfer unit to transfer the obtained image file to the specified transfer destination.

12. The image forming apparatus of claim 1, wherein
the display unit includes a display judging unit operable to judge, according to a set security level, whether a display of the indicated storage destination is permitted, and
the display unit displays the indicated storage destination when the display judging unit determines that the display is permitted, while not displaying the indicated storage destination when the display judging unit determines that the display is not permitted.

13. The image forming apparatus of claim 1, wherein
the identification information piece and the storage-destination information piece for the each of one or more image files are stored in an external apparatus on the network, and
the 1st obtaining unit obtains the identification information pieces and the storage-destination information pieces from the external apparatus via the network.

14. The image forming apparatus of claim 1, wherein
the each of one or more image files is stored in a server on the network, and the storage destination is a storage location of the each of one or more image files in the server.

15. An image processing method for an image forming apparatus connected to at least a file server via a network and used for forming an image on a sheet, comprising the steps of:
(a) obtaining via the network, with respect to each of one or more image files related to an authenticated user, (i) a corresponding identification information piece and (ii) a corresponding storage-destination information piece indicating a storage destination;
(b) displaying the obtained identification information pieces;
(c) receiving a specification of, among the displayed identification information pieces, an identification information piece for an image file that the user desires to obtain;
(d) requesting to the file server to transmit the image file that the authenticated user desires to obtain; and
(e) receiving from the file server, via the network, the desired image file corresponding to the specified identification information piece from a storage destination indicated by a storage-destination information piece of the desired image file.

16. The image processing method of claim 15, further comprising the steps of:
(e) receiving a specification of a transfer destination of the storage-destination information piece of the desired image file;
(f) generating access information which allows, when an external apparatus requests to access the desired image file, the external apparatus to indirectly access the desired image file via the image forming apparatus itself; and
(g) transferring the access information to the specified transfer destination.

17. The image processing method of claim 16, further comprising the steps of:
(h) setting a security level, wherein
the storage-destination information piece is information which allows, when the external apparatus requests to access the desired image file, the external apparatus to directly access the desired image file without involving the image forming apparatus, and
the step (g) transfers one of the generated access information and the storage-destination information piece to the specified transfer destination according to the set security level.

18. The image processing method of claim 16, further comprising the steps of:
(h) judging, when the external apparatus requests to access the desired image file based on the access information, whether a user of the external apparatus is authorized to access the indicated storage destination, wherein
the step (d) obtains the desired image file from the indicated storage destination when the user is determined as authorized, and
the step (g) transfers the image file obtained in the step (d) to the external apparatus.

19. The image processing method of claim 16, wherein
the step (g) receives confirmation of whether the transfer is necessary from the authenticated user before the step (d) obtains the desired image file, and prohibits the step (d) from obtaining the desired image file when the transfer is confirmed as necessary.

20. A computer-readable medium storing a program which, when executed by a processor, causes a computer to execute processes in an image forming apparatus connected to at least a file server via a network and used for forming an image on a sheet, comprising the processes of:

(a) obtaining via the network, with respect to each of one or more image files related to an authenticated user, (i) a corresponding identification information piece and (ii) a corresponding storage-destination information piece indicating a storage destination;
(b) displaying the obtained identification information pieces;
(c) receiving a specification of, among the displayed identification information pieces, an identification information piece for an image file that the user desires to obtain;
(d) requesting to the file server to transmit the image file that the authenticated user desires to obtain; and
(e) receiving from the file server, via the network, the desired image file corresponding to the specified identification information piece from a storage destination indicated by a storage-destination information piece of the desired image file.

* * * * *